Oct. 10, 1944.  O. HAAS  2,360,054
INSERT EXPANDING TOOL
Filed Oct. 16, 1943
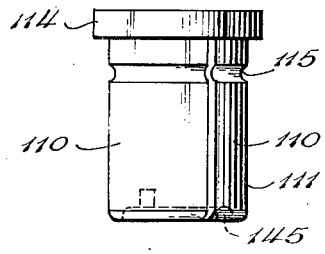
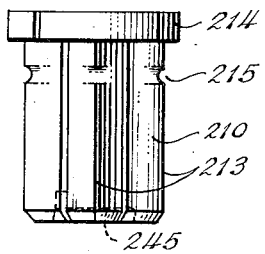
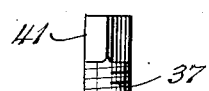
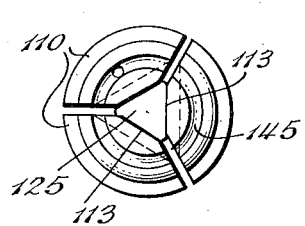
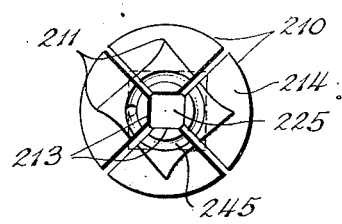
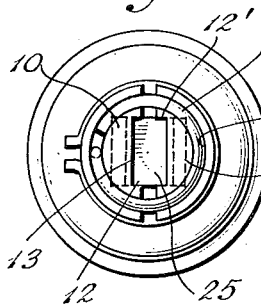
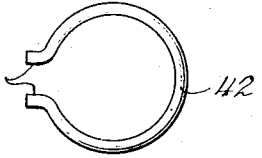
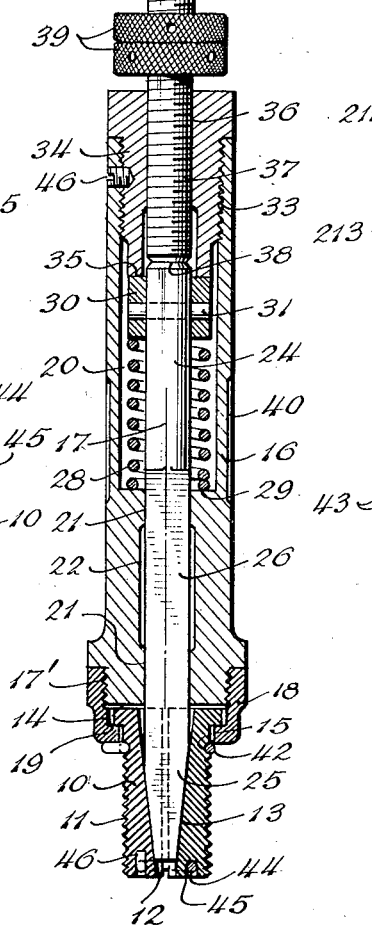
INVENTOR
OTTO HAAS
BY Walter S. Sterton
ATTORNEY Patented Oct. 10, 1944

2,360,054

UNITED STATES PATENT OFFICE 2,360,054

INSERT EXPANDING TOOL

Otto Haas, Richmond Hill, N. Y., assignor to Aircraft Screw Products Company, Inc., Long Island City, N. Y., a corporation of New York Application October 16, 1943, Serial No. 506,531

8 Claims. (Cl. 10—1)

This application is a continuation in part of my co-pending application Serial Number 493,329, filed July 3, 1943.

The present invention relates to an expanding tool for setting, in a hole or bore, an insert of substantially hollow cylindrical character, and more in particular, for setting a wire coil in an interiorly threaded member of a screw connection. The invention aims to provide a tool of the mentioned type useful even if the hole to which the insert is to be applied is a so-called blind hole making it impossible to use an expanding tool with a pilot end as usually provided in the conventional type of tools for setting and expanding inserts. The invention further aims to provide a tool in which the expansion occurs in true radial direction and to the same extent over the entire length of the part to be expanded. Another object of the invention is the provision of a tool of the mentioned type wherein parts are exchangeable so as to render the tool applicable for extraction of an insert of the said character. The invention mainly consists in that the tool comprises a plurality of jaws provided with an interior plane face, engaged by a wedge-shaped driver. This driver is axially shiftable and guided against rotation in a body to which the jaws are attached so as to be free to float to a limited extent in a radial direction. The outer surface of the jaws may be shaped as best fitted for the particular job to which the tool is to be applied.

Further objects and details of the invention will be apparent from the description given hereinafter and the accompanying drawing showing an embodiment thereof by way of example.

In the drawing,

Fig. 1 is a longitudinal cross-section of a tool according to the invention;

Fig. 2 is a bottom plan view of the tool;

Fig. 3 is a top plan view of a part of the tool of Fig. 1 at a larger scale;

Figs. 4 and 5 are a side elevation and a bottom plan view respectively of a modified set of jaws; and Figs. 6 and 7 are similar views of another modification of the jaws.

Referring now to the drawing, 10 denotes a pair of jaws which in the case of the present embodiment are externally threaded at 11 according to the cross-section and pitch of a wire coil insert to be expanded by the tool. If the latter is to be used for inserts of other shape the jaws should have corresponding outer surfaces. The jaws 10 are further provided each with an interior sloping plane 13 constituting a wedge face for cooperation with a driver which will be described hereinafter. Each plane 13 may form the base of a channel 12 with flanks 12' as clearly shown in Fig. 2, to be engaged by the driver simultaneously with the base 13. The jaws have top flanges 14 and are provided with a recess 15 between said flange and the threading 11. Although only two jaws have been shown it is, of course, possible to use more than two in which event, however, the wedge face should not be bordered by channel flanks 12' in order to avoid interference with the driver movement.

The jaws are attached to a substantially cylindrical body 16 with longitudinal axis 17. For this purpose, the lower end of the body is provided with an external threading 17' on which a cap nut 18 is screwed. The latter has an opening sufficiently wide to permit the threaded portions of the jaws 10 to be passed through it when they are put in close contact with respect to each other. If this is done the flanges 14 will bear on the internal shoulder 19 of the cap nut the interior space of which is wide enough to permit spreading of the jaws as far as required.

Body 16 forms a cylindrical chamber 20 in its upper portion. Its lower portion has a square bore 21 which for reasons of facilitating the manufacture of the tool may be recessed as shown at 22. A preferably rod-like driver 24 is inserted into the body so that its lower end 25 engages the channels 12 of the jaws 10. For this purpose the driver end 25 is wedge-shaped on two opposite sides with an angle of taper equal to that of the slope of the faces 13 of the jaws. The other sides of the cross-section of the driver end 25 are straight-faced so as to engage the flanks 12' of the jaws 10. Owing to the fact that the engaging wedge faces are plane, the jaws are prevented from rotation in relation to the driver. The channel flanks 12' are helpful to the same purpose. Furthermore, it will be noticed that the wedge faces 13 are provided opposite the threaded surface 11, and that the wedging portion 25 of the driver engages these faces substantially between the upper and lower ends of the threaded jaw portions. Owing to this arrangement it is insured that the jaws will move in a radial path without tending to tilt under the wedging action and thus will exert substantially equal pressure, throughout the threaded surface, on an insert to which the tool may be applied. The middle driver portion 26 is of square cross-section and engages in the square bore 21 of the body. Thus the driver is longitudinally shiftable but body, driver and jaws are connected for rotation as a unit. The upper portion of the driver projects into the chamber 20 and is surrounded by a spring 28 bearing with its lower end on the bottom 29 of chamber 20 and with its upper end against a collar 30 secured to the driver by means of a pin 31. It is, of course, possible also to make the collar as an integral part of the driver.

The top portion of the chamber 20 is provided with an interior threading 33 into which a plug 34 is screwed. The plug has a lower shoulder 35 limiting the upward movement of the driver 24. A set screw 46 may be applied to prevent undesired loosening of the plug 34. Plug 34 is also provided with an interior threading 36 engaged by a screw shaft 37 which projects upwardly from the body and plug and bears with its lower end 38 on the top face of the driver 24. Interiorly threaded lock collars 39 may be screwed on shaft 37 so as to adjust the distance the shaft 37 may be screwed down in plug 34. In order to facilitate handling of the tool the body 24 may be knurled as indicated at 40, and the screw shaft 37 may be provided with the head 41 to which a wrench may be applied. Furthermore, in order to insure the the jaws are in collapsed state before an expanding force is applied a spring ring 42 may be inserted in the groove or recess 15 which for this purpose may be longer than required in order to harbor the projecting portion of the cap nut 18. The spring ring 42 may have outwardly projecting tangs 43 as shown in Fig. 3 in order to facilitate insertion and removal of the ring. Another spring ring 44 may be embedded in a circular groove 45 in the bottom of the jaws and may be anchored in one of the jaws by an upwardly projecting end 46.

The tool may be used in the following manner: While screw shaft 37 is so far withdrawn that the driver collar 30 abuts against the shoulder 35 of the plug 34, and consequently the jaws are in collapsed position, in which they abut against each other owing to the action of springs 42 and 44, the tool is bodily screwed with the threading of the jaws into an insert to be expanded. When the lower surface of the jaws contacts the bottom of the hole to which the insert is applied, or if the top rim of such hole abuts against the lower face of the cap nut 18, the tool body will be held in such position and a wrench applied to screw shaft head 41 so as to screw the latter inward, thereby exerting pressure on driver 24 which with its lower wedge-shaped end 25 will expand the jaws, thus pressing the insert in radial direction against the wall of the hole to which it is applied. The correct expanding force or the desired expansion can be set by adjusting the collars 39 so that operation of shaft 37 comes to an end when the lower collar 39 abuts against the top face of plug 34. In order to remove the tool from the job, screw shaft 37 is to be turned in the opposite direction in relation to the body 16 whereupon spring 28 forces the driver 24 upward until it abuts against shoulder 35. This movement withdraws the wedge end 25 from wedging position so that spring rings 42 and/or 44 will collapse the jaws which now can be easily removed by turning body 16 which is connected for common rotation with the jaws by the square cross-section of the driver.

It has been stated hereinbefore that the outer surface of the jaws may be shaped as best fitted for the particular job. For instance, it has been found in certain cases that even if the tool is applied to a screw-thread insert it is unnecessary to provide the jaws also with a screw threading such as shown at 11 in Fig. 1, and that jaws with a cylindrical outer surface can be used to set such insert with the advantage of savings in time required to place the tool in working position. Jaws 110 of such kind are illustrated in Figs. 4 and 5, where the cylindrical surface is denoted by 111. Grooves 115 and 145 are provided to receive therein spring rings 42 and 44 respectively, as shown in Fig. 1, and flanges 114 serve a purpose similar to flange 14 of the jaws 10, i. e. for the attachment of the jaws to the body 16 by means of cap nut 18. It will be further noticed that in the modification of Figs. 4 and 5 a set of jaws is shown as consisting of three individual pieces, each of which has an interior slanting plane surface 113. These surfaces constitute the walls of a space of substantially equilateral triangular cross-section, which may be engaged by a correspondingly wedge-shaped driver end 125. However, it will be clear that the number of jaws forming a set may be selected as desired, it being necessary only that the driver end has as many wedge faces as there are jaws to a set.

Another set of jaws is shown in Figs. 6 and 7 where the set consists of four individual jaws 210. In this case the four slanting inner faces 213 enclose a space of substantially square cross-section and consequently, the wedging end 225 of the driver used with this set of jaws has also a substantially square cross-section. Each jaw in the modification of Figs. 6 and 7 has a rather sharp outer edge 211 to bite into the material of an insert when a tool with the jaws 210 is applied thereto and the jaws are expanded in order to remove the insert from a hole in which it is set. The jaws are provided with flanges 214 and grooves 215 and 245 for the same purpose as the corresponding parts 14, 15 and 45 respectively, in the tool of Fig. 1.

If it is intended to use in the tool of Fig. 1 jaws of the type of Figs. 4 or 6, it is only necessary to unscrew cap nut 18, remove the jaws 10, insert the jaws 110 or 210 in the cap nut and screw the latter back in place. If all the sets of exchangeable jaws consist of the same number of individual jaws the same driver 24 can be used. Otherwise, the driver must be exchanged for one the lower end of which has as many wedge faces as there are jaws to the set intended to be used.

It will be apparent to those skilled in the art that many alterations and modifications of the structure illustrated and described may be made without departing from the spirit and essence of my invention, which shall be limited only by the scope of the appended claims.

I claim:

1. An expanding tool comprising an elongated body with a longitudinal axis, a plurality of jaws made separate from said body and connected to one end of said body for common rotation and in axial alignment therewith but movable as a whole to a limited extent in radial direction, said jaws being internally provided with plane wedge faces, a driver interiorly of said body secured for common rotation but axially movable in relation thereto, said driver having a wedge-shaped end with plane faces in engagement with the wedge faces of said jaws, and means in engagement with said body and said driver to shift the driver relatively to said body so as to spread said jaws.

2. An expanding tool comprising an elongated body with a longitudinal axis, a plurality of jaws connected to one end of said body for common rotation and in axial alignment therewith but movable to a limited extent in radial direction, said jaws being internally provided with wedge faces, resilient means in engagement with said jaws and tending to hold them together, a driver interiorly of said body and secured for common rotation but axially movable in relation thereto, said driver having a wedge-shaped end in engagement with the wedge faces of said jaws, and means in engagement with said body and said driver to shift the driver relatively to said body so as to spread said jaws.

3. An expanding tool as claimed in claim 2 wherein the plurality of jaws as a unit is provided with an external screw threading of a cross-section and pitch according to the inner threading of a job to which the tool is intended to be applied.

4. An expanding tool as claimed in claim 2 wherein the plurality of jaws as a unit has a substantially cylindrical outer surface.

5. An expanding tool as claimed in claim 2, each jaw being provided with a substantially sharp outer edge extending longitudinally of the jaw.

6. An expanding tool as claimed in claim 2, wherein two substantially semi-cylindrical jaws are provided, each jaw constituting a channel with sloping base and straight flanks, and said wedge-shaped end of the driver having two opposite wedge faces in engagement with said channel bases, and two straight flanks in engagement with said channel flanks, so as to prevent said jaws from turning relatively to said body.

7. An expanding tool comprising an elongated body with a longitudinal axis, a plurality of jaws connected to one end of said body for common rotation and in axial alignment therewith but movable to a limited extent in radial direction, said jaws being internally provided with wedge faces, resilient means in engagement with said jaws and tending to hold them together, a driver interiorly of said body and secured for common rotation but axially movable in relation thereto, said driver having a wedge-shaped end in engagement with the wedge faces of said jaws, screw means in connection with said body and in engagement with said driver to force the latter in a direction to spread the jaws, and second resilient means between said body and said driver to shift the latter in the opposite direction when said screw means are withdrawn.

8. An expanding tool comprising an elongated body with a longitudinal axis, a plurality of jaws connected to one end of said body for common rotation and in axial alignment therewith but movable to a limited extent in radial direction, said jaws being internally provided with wedge faces, resilient means in engagement with said jaws and tending to hold them together, a driver interiorly of said body and secured for common rotation but axially movable in relation thereto, said driver having a wedge-shaped end in engagement with the wedge faces of said jaws and a collar at its other end, a spring within said body and bearing against said collar so as to tend to move said driver out of engagement with said jaws, an interiorly-threaded plug secured to the other end of the body and including an abutment for said collar, and a screw shaft in engagement with the plug threading so as to bear on the collar-provided end of the driver.

OTTO HAAS.